United States Patent [19]
Hahn

[11] 3,741,507
[45] June 26, 1973

[54] TIRE BEAD CORE RING
[75] Inventor: Friedrich Wilhelm Hahn, Nachrodt, Germany
[73] Assignee: Hahn & Co. KG, Nachrodt, Germany
[22] Filed: June 2, 1971
[21] Appl. No.: 149,138

[30] Foreign Application Priority Data
June 2, 1970 Germany.................. P 20 26 874.0

[52] U.S. Cl. ............................................... 245/1.5
[51] Int. Cl. .......................................... B60c 15/04
[58] Field of Search...................... 245/1.5; 152/362; 57/139, 144, 145, 141; 140/88

[56] References Cited
UNITED STATES PATENTS
1,715,302  5/1929  Michelin ............................ 245/1.5
1,774,748  9/1930  Gore .................................... 57/145
1,270,053  6/1918  Ream ................................... 57/141
1,349,898  8/1920  Marquette ......................... 245/1.5
1,349,898  8/1920  Marquette ......................... 245/1.5
3,659,038  4/1972  Shealy ................................. 57/145

FOREIGN PATENTS OR APPLICATIONS
1,418,887  10/1965  France ........................... 152/362 R Primary Examiner—Richard J. Herbst
Attorney—Spencer & Kaye

[57] ABSTRACT

A tire bead core ring for being embedded within the bead of a tire including at least two cable rings each of a wire stem and at least one layer of wires concentric therewith, and at least one layer of wires encasing the cable rings and bringing them into a supporting and force-transmitting relationship.

17 Claims, 3 Drawing Figures

PATENTED JUN 26 1973 3,741,507
FIG.1
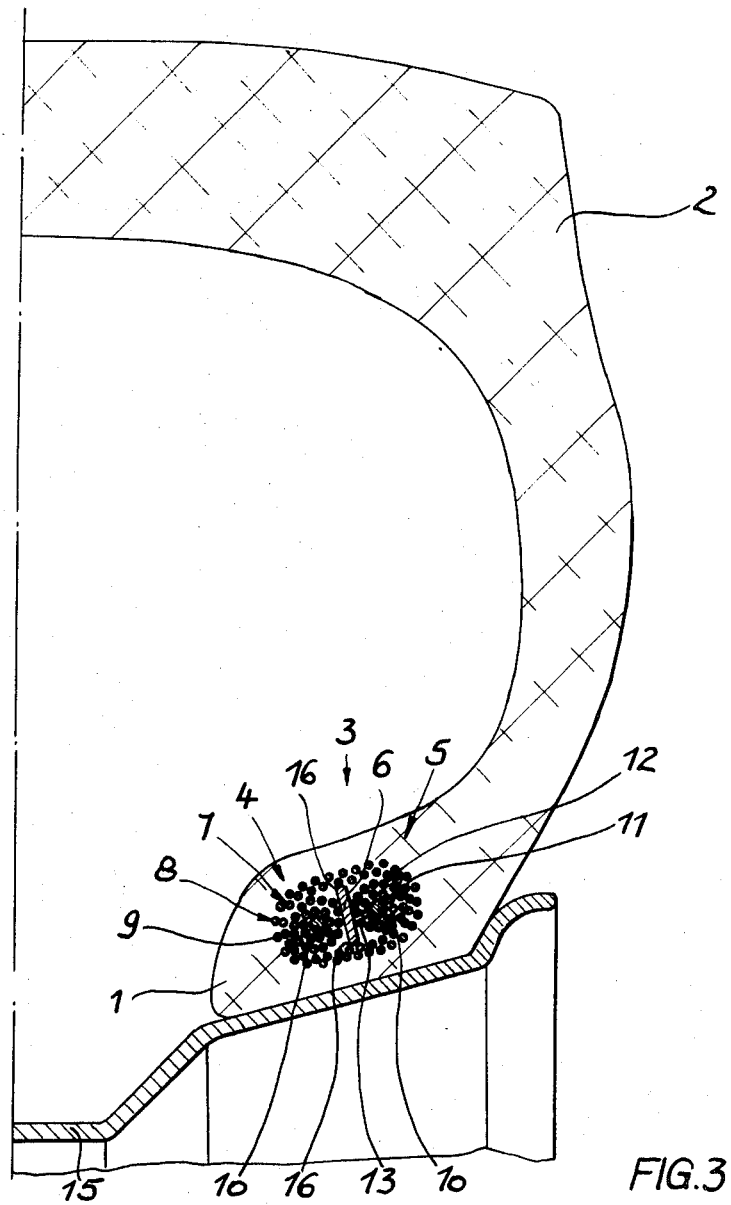
FIG.2
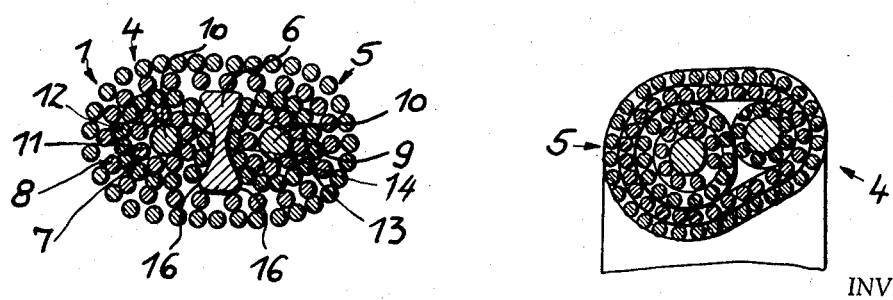
FIG.3
INVENTOR
Friedrich Wilhelm Hahn
BY *Spencer & Kaye*
ATTORNEYS.

TIRE BEAD CORE RING

BACKGROUND OF THE INVENTION

The present invention relates to a tire bead core ring and more specifically to a tire bead core ring for reinforcing the bead of air-filled tires, particularly of tubeless radial truck tires.

Air-filled tire beads are usually reinforced by wire inserts having a rectangular or round cross-section. The contact areas with the rim, on which the beads lie, generally have a slight inclination of about 5° with reference to the axis of rotation of the wheel. With certain tires, for example tubeless tires, rims are mainly used which have a somewhat greater inclination of the rim shoulder, for example about 15°.

In order to produce as much contact pressure between the rim shoulder and the tire beads, the tire beads must be provided with an inclination which corresponds to that of the rim shoulder.

It has been attempted to impart an inclination to the area of the bead core facing the rim shoulder which is the same as that of the shoulder. To this end, a gummed steel wire or a flat tape was wound in several superimposed layers about a conical winding device. These bead cores had a polygonal cross-section. Bead cores of this type, however, were found to have the drawback that the ends of the carcass layers which are folded about the bead cores produced more resistance against pivoting of these layers during cambering and produced more local tensions than, for example, a bead core which forms a circular cross-section.

A bead core having a circular cross-section which includes a stem about which one or a plurality of layers of wire are wound in the shape of a helix was found to exhibit advantages such as the almost 100 percent effectiveness of the bead, i.e., almost the entire breaking load of the bead core ring was utilized. The breaking load being at least approximately equal to the sum of the breaking loads of the individual winding wires.

In addition, the geometric accuracy and the low compressibility of the bead core ring were found to lead to high uniformity of the tire to a degree that could not be obtained with the use of other known bead core constructions.

The circular cross-section of the bead core, however, has the drawback with tires on a steep shoulder rim that it results in too low a contact pressure since it is in contact with the rim shoulder, via the bead enclosing it, only in a tangential manner.

SUMMARY OF THE INVENTION

It is, therefore, an object of the present invention to provide a bead core ring which overcomes, to a substantial degree, the disadvantages of presently existing bead core rings such as mentioned above.

It is a more particular object of the present invention to provide a bead core ring in which the advantages of a bead core ring which is wound helically about a stem are maintained and in which simultaneously therewith, a sufficient contact pressure is obtained which prevents air leaks out of the tubeless tire and slipping over the low wheel flange.

These and other objects can be accomplished according to one embodiment of the present invention by providing at least two concentrically disposed, endless wire cable rings or the like with differing annular diameters. The two endless wire cable rings are supported with their facing or longitudinal sides along the facing or longitudinal sides of a spacer ring. The spacer ring is provided with an approximately rectangular cross-section. The support is such that force-transmission between the cable rings and the spacer ring is possible. The two endless wire cable rings and the spacer ring are enclosed by at least one layer of helically wound endless wires. The longitudinal sides of the spacer ring correspond approximately to the diameter of the cable rings.

In this manner, a tire bead core is obtained which has a high tensile strength with a previously unattainable firm cohesion of the wire windings and layers to one another as well as large-area supporting surfaces facing the rim shoulder.

As an alternate feature, the longitudinal edges of the spacer ring are rounded, it having been found to be particularly advantageous for the radius of curvature of the longitudinal edges of the spacer ring to be equal to or greater than one-half the diameter of a wire of a cable ring. This has the advantage that the durability of the outer layer of helically wound endless wires is not influenced by the longitudinal edges of the spacer ring any more than by the wires of the cable rings.

As another alternative feature, the longitudinal sides of the spacer ring facing the cable rings are concave and the longitudinal sides of the cable rings engage the concave sides of the spacer ring. This has the advantage of improving the positional stability of the cable rings. Under certain circumstances, it is desirable to have the cable rings in a form-fitting manner engage in the concave sides of the spacer ring.

In one preferred embodiment the cable rings each include an endless wire ring as a stem and two superimposed layers of helically wound endless wires. The cross sectional diameter of the wire ring serving as the stem is preferably twice the cross sectional diameter of the wire of the helically wound endless wires. The cable rings may be separated by a massive spacer ring having an approximately rectangular cross section whose thickness approximately corresponds to the diameter of the helically wound wires. The cable rings and spacer ring are then encased by two superimposed layers of helically wound endless wires, whose diameter approximately corresponds to the diameter of the helically wound endless wires. The layers of wire are wound with opposite pitch from layer to layer.

BRIEF DESCRIPTION OF THE DRAWINGS

FIG. 1 is a cross-sectional view of a portion of a truck tire having an embedded tire bead core.

FIG. 2 is a cross-sectional view of a further embodiment of the tire bead core.

FIG. 3 is a cross-sectional view of a further embodiment of a tire bead core ring.

DESCRIPTION OF THE PREFERRED EMBODIMENT

In FIGS. 1 and 2 the bead 1 of a tire 2, such as a truck tire, has imbedded therein a tire bead core 3 comprising two endless cable rings 4 and 5, between which a massive spacer ring 6 of preferably steel having a rectangular cross-section is disposed. Two layers 7 and 8 of endless helically and oppositely wound steel wires 9 are arranged about the spacer ring 6 and the cable rings 4 and 5. Each one of the endless cable rings 4 and 5 includes an endless wire ring stem 10 and two layers 11 and 12 of endless helically and oppositely wound wires 13.

Wires 9 and 13 have the same cross-sectional diameters. The wire diameter of wire ring stem 10 is preferably twice that of wires 9 or 13, although it should be understood that other ratios of wire diameters may be utilized if so desired.

In FIG. 2, one layer 11 of nine endless wires 13 and a layer 12 of 15 endless wires 13 are helically wound around each wire ring 10 constituting the stem of a cable ring 4 and 5. Both cable rings 4 and 5 and the spacer ring 6 are firmly encased by two layers 7 and 8. The inner layer 7 having 22 endless helically wound wires 9 and the outer layer 8 35 such wires 9. Layers 11, 12, 7 and 8 are disposed with opposite pitch to one another.

A special feature of the tire core bead of FIG. 2 compared to that of FIG. 1 is that the longitudinal sides 14 of spacer ring 6 facing the cable rings 4, 5 are concave and the cable rings 4, 5 are in engagement therewith in a form-fitting manner. In addition, the force-transmission between the cable rings and spacer has been enhanced because of the greater contact area.

The tire bead 1 is supported at the steep shoulder rim 15.

Under certain circumstances it might be particularly advantageous to select the number of wires and/or layers per cable ring in a different manner. For example, the cable ring 4 may include only one wire ring 10. The cable ring 5, however, may include a wire ring 10 and one or a plurality of layers 11, 12 of endless wires 13. It should be understood that other combinations with respect to the cable rings may be utilized as desired. The curvatures of the longitudinal edges of the spacer ring 6 are marked 16.

In the embodiment shown in FIG. 3 the cable rings 4 and 5 have different annular and cross-sectional diameters. A spacer ring 6 as shown in FIGS. 1 and 2 may of course also be disposed here between the two cable rings 4 and 5. It should be understood that a force-transmission capability is present even without the spacer ring. All wire rings and wires may also include a different material than steel, for example of a synthetic material having steel-like characteristics.

It will be understood that the above description of the present invention is susceptible to various modifications, changes and adaptations, and the same are intended to be comprehended within the meaning and range of equivalents of the appended claims.

I claim:
1. A tire bead core ring for being embedded within the bead of a tire to extend around the circumference of the bead, comprising, in combination:
   a. a plurality of cable rings, said rings being of relatively differing annular diameters in the direction of the bead circumference; and
   b. at least one layer of helically wound endless wire encasing said plurality of cable rings and maintaining said plurality of cable rings in supporting and force-transmitting relationship with each other.

2. The bead core ring of claim 1, wherein said plurality of cable rings comprise an endless wire ring stem and at least one layer of a helically wound endless wire concentric therewith.

3. The bead core ring of claim 1, wherein said plurality of cable rings are of equal ring cross-sectional diameter.

4. The bead core ring of claim 1, wherein said plurality of cable rings are of relatively differing ring cross-sectional diameter.

5. The bead core ring of claim 2, wherein the cross-sectional diameter of said endless wire ring stem is larger than the cross-sectional diameter of said helically wound endless wire concentric therewith and wherein the cross-sectional diameter of said helically wound endless wire concentric therewith is equal to the cross-sectional diameter of the wire comprising said at least one layer of helically wound endless wire encasing said plurality of cable rings.

6. A tire bead core ring for being embedded within the bead of a tire to extend around the circumference of the bead, comprising in combination:
   a. a spacer ring having an approximately rectangular cross-section;
   b. at least two endless cable rings concentrically disposed with respect to the axis of rotation of a tire, said rings being of different annular diameters in the direction of the bead circumference; and
   c. at least one layer of helically wound endless wire encasing said at least two endless cable rings and said spacer ring and maintaining said at least two endless cable rings in supporting and force-transmitting relationship with said spacer ring.

7. The bead core ring of claim 6, wherein said cable rings are of equal ring cross-sectional diameter.

8. The bead core ring of claim 6, wherein said cable rings are of relatively differing ring cross-sectional diameter.

9. The tire bead core ring of claim 6, wherein the spacer ring has an approximately rectangular longitudinal cross-section and wherein said cable rings are supported along the longitudinal sides of the spacer ring.

10. The tire bead core ring of claim 6, wherein the longitudinal side of the spacer ring corresponds approximately to the diameter of the cable rings.

11. The tire bead core ring of claim 6, wherein the longitudinal edges of the spacer ring are rounded.

12. The tire bead core ring of claim 6, wherein the radius of curvature of the longitudinal sides of the spacer ring is equal to or greater than one-half the diameter of a wire of a cable ring.

13. The tire bead core ring of claim 6, wherein the sides of the spacer ring which face the cable rings are concave and the cable rings engage said concave sides.

14. The tire bead core ring of claim 6, wherein said cable rings each comprise an endless wire ring stem and a plurality of layers of helically wound endless wires concentric therewith, the wire cross-sectional diameter of said endless wire ring stem is preferably about twice as large as the wire cross-sectional diameter of said wires comprising said helically wound endless wires concentric therewith, and wherein the thickness of said spacer ring approximately corresponds to the cross-sectional diameter of said helically wound endless wires concentric therewith, and wherein there are two layers of helically wound endless wires which firmly encase the spacer ring and said at least two endless cable rings, the cross-sectional diameter of the wire of said layers of helically wound endless wires encasing the spacer ring and said at least two endless cable rings approximately corresponds to the cross-sectional diameter of the helically wound endless wires which are concentric with said endless wire ring stem, said wire layers being wound with oppositely directed pitch from layer to layer.

15. The tire bead core ring of claim 10, wherein the number of helically wound endless wires in each layer of helically wound endless wires concentric therewith is different for each cable ring.

16. The tire bead core ring of claim 10, wherein the number of layers of helically wound endless wires concentric therewith is different for each cable ring.

17. The tire bead core ring of claim 1 wherein each said cable ring consists of an endless wire ring stem.

* * * * *